July 26, 1938. A. W. DE VOUT 2,124,691
METHOD AND APPARATUS FOR DIPPING POULTRY
Filed Feb. 8, 1935 4 Sheets-Sheet 1

WITNESS-

Anson W. De Vout
INVENTOR
BY
ATTORNEY

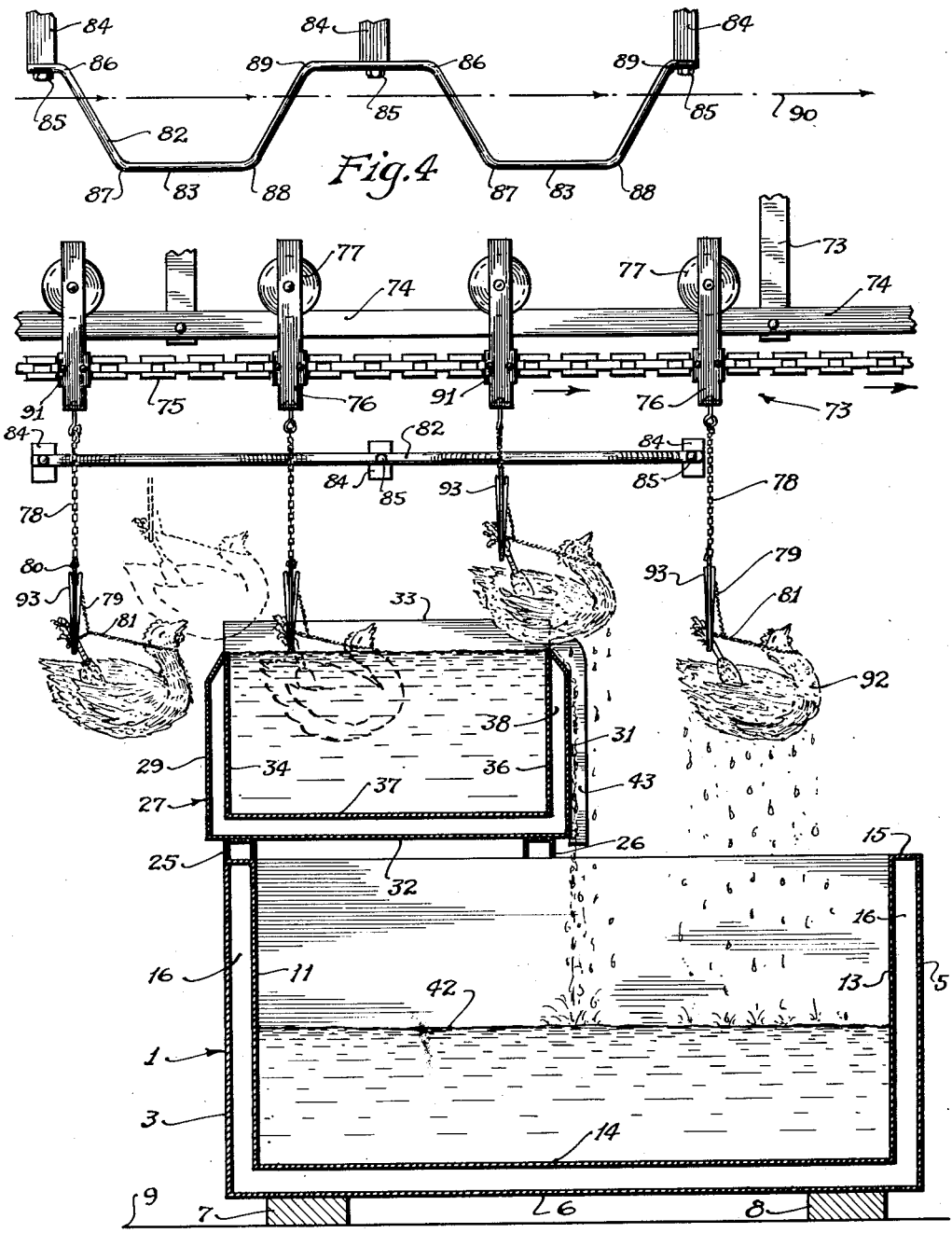

July 26, 1938.  A. W. DE VOUT  2,124,691
METHOD AND APPARATUS FOR DIPPING POULTRY
Filed Feb. 8, 1935  4 Sheets-Sheet 4

WITNESS-

Anson W. DeVout
INVENTOR
BY
ATTORNEY

Patented July 26, 1938

2,124,691

UNITED STATES PATENT OFFICE 2,124,691

METHOD AND APPARATUS FOR DIPPING POULTRY

Anson W. De Vout, La Grange Park, Ill., assignor to Industrial Patents Corporation, Chicago, Ill., a corporation of Delaware Application February 8, 1935, Serial No. 5,641

15 Claims. (Cl. 17—11.1)

This invention relates to an apparatus and method for coating fowl.

One of the objects of the invention is to provide a device whereby the carcasses of fowl may be automatically coated with a defeathering compound as a means for facilitating the removal of pin feathers, hair, dermal excrescences, and other matter from the skin thereof.

Another object of the invention is to provide a stationary tank for receiving the carcasses of fowl in which a defeathering compound contained therein will be automatically and continuously maintained at a predetermined temperature.

Another object of the invention is to provide means for maintaining a supply of wax or other defeathering compound within the dipping tank at a predetermined level.

Another object of the invention is to provide a device in which the temperature of a segregated body of the compound is automatically controlled.

Another object of the invention is to provide means by which defeathering compound dripping from fowl being carried from the dipping tank, will be caught in a main supply tank and recirculated to the dipping tank.

Another object of the invention is to provide means for raising and lowering fowl suspended from and carried on a conveyor.

Another object of the invention is to provide a novel method of coating fowl with a defeathering compound, comprising suspending the fowl at a plane below the level of defeathering compound contained in a dipping tank, advancing the fowl while so suspended within the path of the tank, and raising and lowering the fowl over the walls of said tank.

Other objects of the invention will be apparent from the description and claims which follow.

In conventional practice, fowl, after slaughter, are semi-scalded in a vat of warm water and then are rough picked, that is, the bulk of the feathers are removed. After rough picking, there remain in the skin the usual hair, down, and pin feathers, which must be removed. A method now common in the art is to coat the rough picked fowl with a congealable compound such as heated wax, which may be chilled and stripped off to remove the remaining dermal excrescences. Owing to the labor involved in manually performing the several steps in defeathering with wax or the like, it has been proposed to employ mechanical means. Devices heretofore proposed have been complicated, bulky and inefficient. The present invention provides a device for this purpose which is simple to construct, easy to operate, and inexpensive to manufacture.

In the drawings similar reference characters in the several figures indicate similar elements.

Figure 3 is a sectional view taken on line 3—3 of Figure 2.

Figure 4 is a plan view of means for raising the fowl over the opposite walls of the dipping tank.

Figure 1:
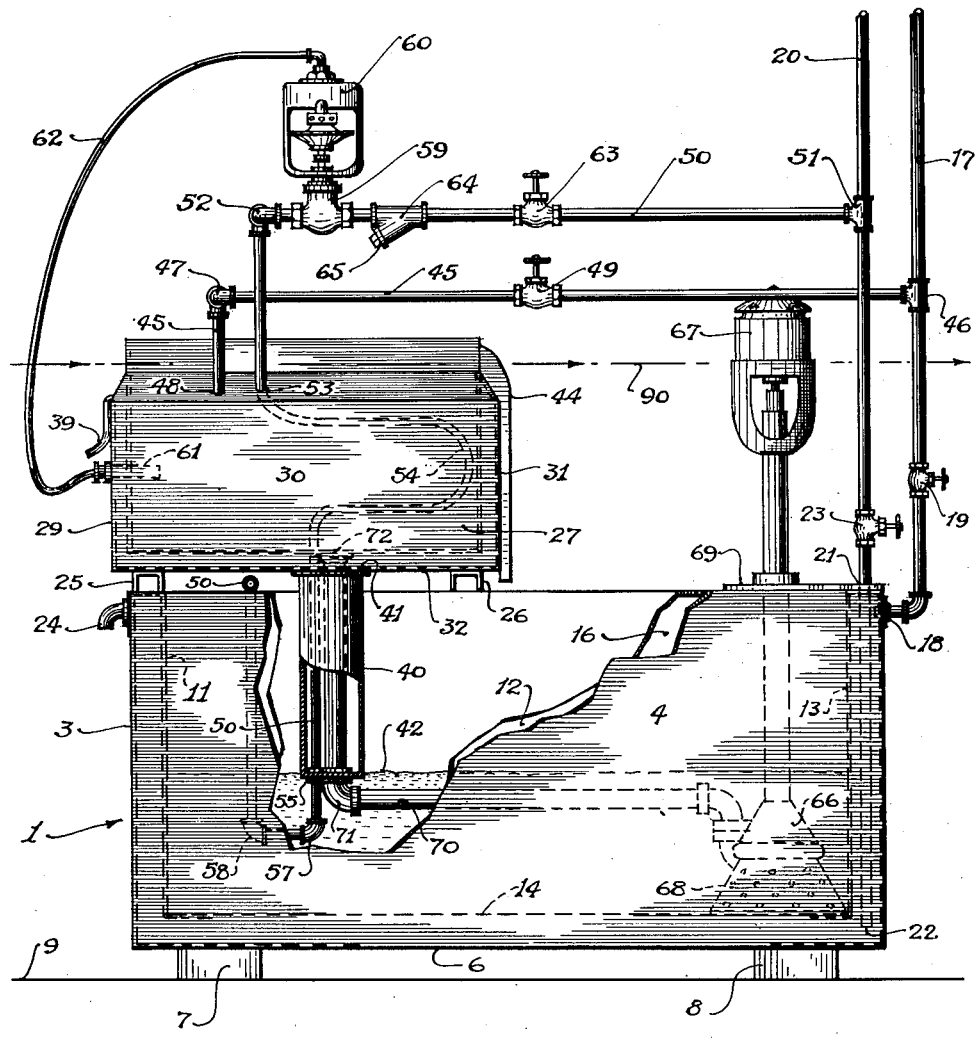
Figure 1 is a front elevation of a preferred embodiment of the invention, parts being broken away.
Figure 2:
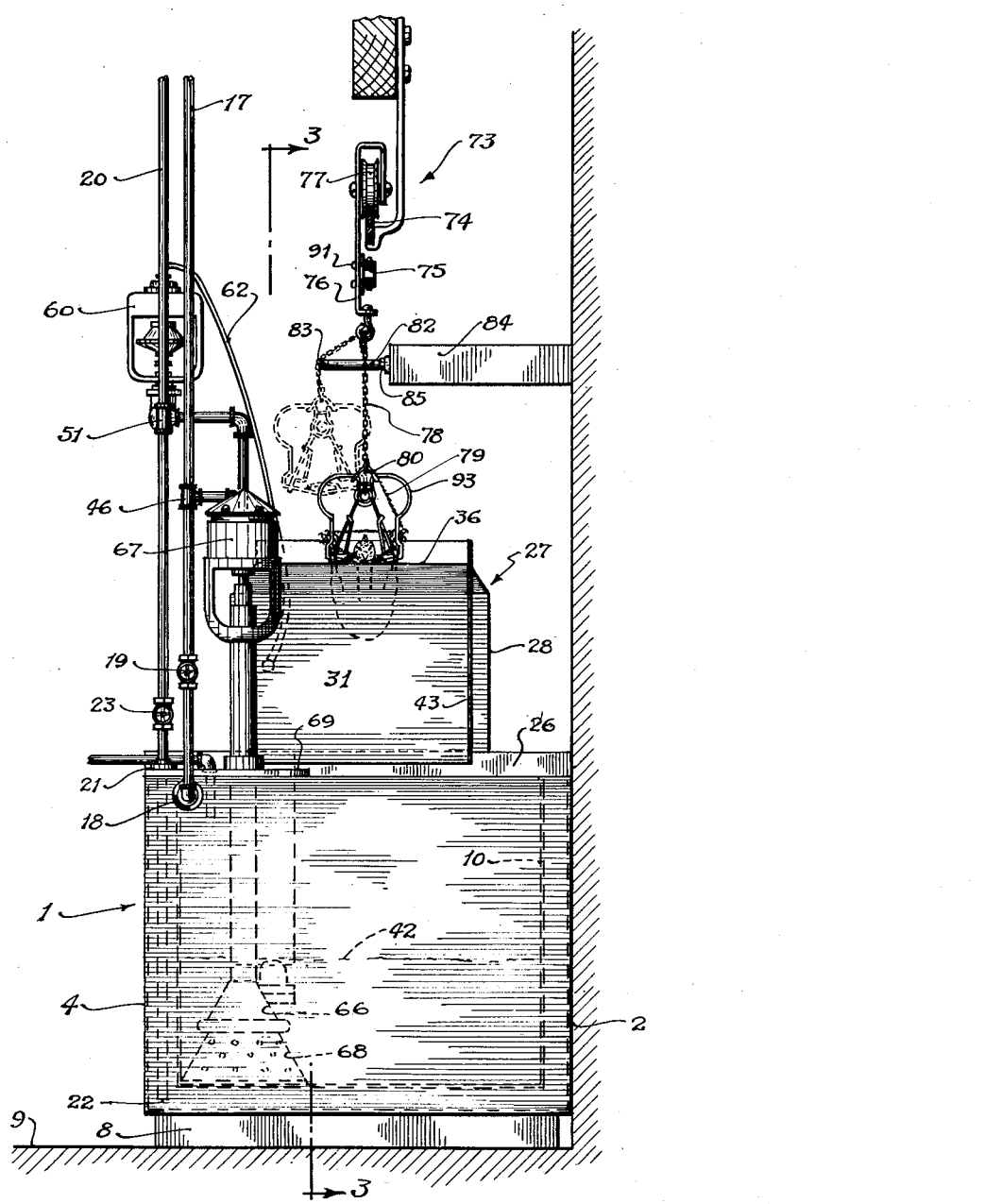
Figure 2 is a side elevation of the device shown in Figure 1, illustrating the conveying means with fowl suspended therefrom.
Figure 5:
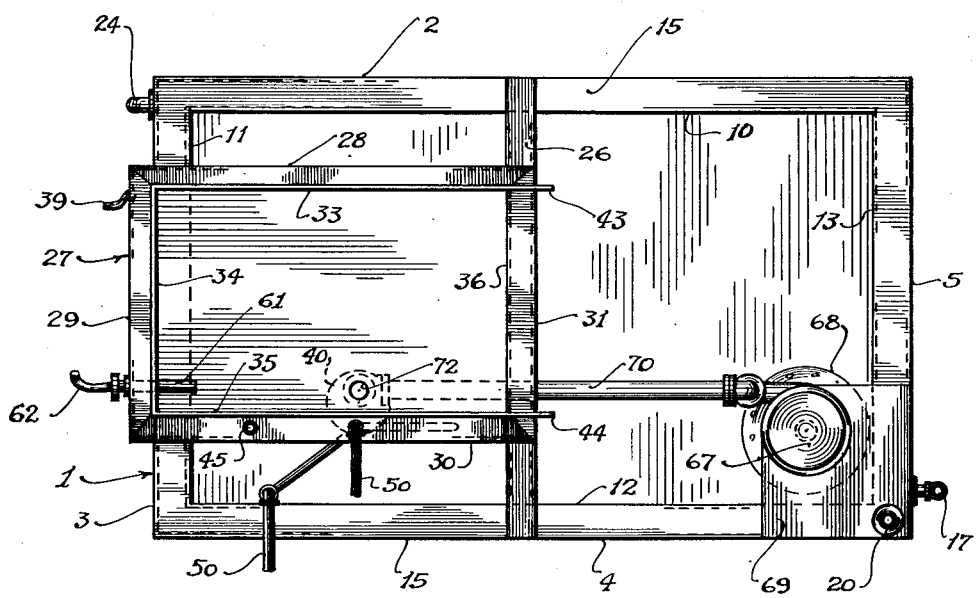
Figure 5 is a plan view of the dipping and supply tanks.

Referring now particularly to Figures 1 and 2. Metal supply tank 1, having four outer walls 2, 3, 4 and 5, and outer bottom 6, is supported by beams 7 and 8 on floor 9. In spaced relation to side walls 2, 3, 4 and 5, and bottom 6, are inner walls 10, 11, 12 and 13, and inner bottom 14. A rectangular strip 15 is secured by welding or in any other suitable manner, to the upper edges of the respective inner and outer walls. The inner and outer walls and bottoms and strip 15 thus define a jacket chamber 16.

Line 17, extending from a source of water supply not shown, enters chamber 16 at 18 and supplies water thereto. The water entering chamber 16 through line 17 may be controlled by valve 19.

Line 20, extending from a source of steam supply not shown, enters chamber 16 at 21 and has a free end 22 terminating at a point near the bottom 6 of chamber 16. Line 20 carries steam to chamber 16 and is provided with steam control valve 23.

Outlet 24 extends outwardly and downwardly from wall 3 and serves as an overflow vent to permit the escape of water and steam from chamber 16. It will be noted that outlet 24 is preferably placed in the wall opposite the free end 22 of line 20 to assure complete circulation of steam through water contained in chamber 16.

Transverse beams 25 and 26 are rigidly secured to the upper edge of the supply tank and act as supports for dipping tank 27. Tank 27 is securely affixed to beams 25 and 26, and comprises four outer walls 28, 29, 30 and 31, and outer bottom 32. The outer walls 28, 29, 30 and 31 converge inwardly near their upper edges and are joined by welding or in any other suitable manner, to inner walls 33, 34, 35 and 36, respectively, in the plane of the top of wall 36, which is shorter than inner walls 33, 34 and 35. The upper portions of walls 33, 34 and 35 serve as splash guards. Inner bottom 37 is rigidly secured to the lower edges of inner walls 33, 34, 35 and 36, thus forming jacket chamber 38 provided with overflow outlet 39. Jacket cylinder 40 communicates with chamber 38 through opening 41 in bottom 32 of tank 27 and is secured to bottom 32 by welding or in any other suitable manner. Cylinder 40 terminates at a point slightly below wax level 42. Splash guards 43 and 44 are secured to the outer wall 31 to direct to tank 1 wax which may flow over short wall 36.

Line 45 extends from T coupling 46 in line 17 to a point above the converged portion of wall 30, and at 47 the free end of line 45 is continued downwardly to enter chamber 38 at 48 and supply water thereto. The water entering chamber 38 through line 45 may be controlled by valve 49.

Line 50 extends from T coupling 51 in steam line 20 and at L coupling 52 turns downwardly to enter chamber 38 at 53 and pass therethrough. Line 50 within chamber 38 may be coiled or twisted in one or more loops as at 54, whence it passes downwardly through cylinder 40 to enter the supply tank at 55. Line 50 at 57 is extended across the supply tank and at 58 turns upwardly to pass over wall 12 and return to the source of steam supply. The supply of steam passing through line 50 is controlled by valve 59, which valve is thermostatically operated by thermostat 60.

Thermostat 60 is actuated by heat variations of the defeathering compound on bulb 61, which is operably connected to thermostat 60 by copper tubing 62. Bulb 61 is inserted through outer wall 29 and inner wall 34 to a suitable distance within tank 27 and is insulated between walls 29 and 34 to prevent heat variations of water in chamber 38 from acting thereon. Thermostat 60 may be set to open valve 59 and permit steam to pass through line 50 upon the substance contained in tank 27 falling below a desired temperature.

Valve 63 is placed in line 50 ahead of valve 59 to close line 50 when the device is not in operation. Y coupling 64 having opening 65 may be placed in line 50 to permit removal of scale therefrom.

Sump pump 66 of any known type, rotated by electric motor 67 and having a perforated conical base 68 is rested on bottom 14 of tank 1 and is rigidly held in place by bracket 69, which is secured to strip 15 by welding or in any other suitable manner. Line 70 extends across tank 1 from pump 66 and at 71 turns upwardly through cylinder 40 and chamber 38 to enter tank 27 at 72 and supply wax thereto.

Referring now to Figures 2 and 3, endless conveyor 73 longitudinally traverses tank 27 and tank 1. Conveyor 73 comprises trolley rail 74 and moving chain 75 upon which brackets 76, having trolley wheels 77 to engage trolley rail 74, means such as bolts 91 to engage brackets 76 with chain 75, and chains 78 depending therefrom, are impelled in the direction shown by the arrows. As shown in Figure 3 for example, the fowl 92, is shackled in shackle 93. Shackle 93 is of the type more particularly described and claimed in my copending application entitled Poultry shackle, Serial No. 640,767, filed November 2, 1932, which issued March 31, 1936, as Patent No. 2,035,948. It is to be understood that the conveying means above described form no part of the present invention but are illustrated merely as a preferred type to be used in connection with the device forming the present application.

Tie string 79 is fastened at one end within the lower link 80 of chain 78, and the free end thereof looped about the legs of fowl. Tie string 81 extends from tie string 79, and is looped about the neck of the fowl, by which it will be seen, the fowls are suspended with the head and feet above the body portion. Chain 78 and tie string 79 are of a definite length, such that the head and feet of the fowl will be kept free of the defeathering compound as they are lowered into tank 27.

In practice, it is desirable that the fowl, as they are advanced within the path of tank 27, be raised above, rather than pulled over the walls 34 and 36, so as to prevent bruising and tearing of the skin. This is accomplished as illustrated in Figures 2, 3 and 4, by means of a guide rail 82 which is horizontally disposed beneath the conveying mechanism in a position such that the depending chains 78 will be guided around bowed portions 83 as they are carried on the conveyor and thereby shortened as shown in Figure 2, so that the fowls are raised over the edge of tank 27 when approaching the same, and likewise raised over the opposite edge of the tank after having been dipped into the defeathering compound. Guide rail 82 is parallel with conveyor 73, in a line slightly below brackets 76 and a trifle to one side of the line of travel 90 of chains 78, and is secured to arms 84 extending from a wall or other fixed place of anchorage by bolts or screws 85. The bowed portions 83 may be of any suitable configuration, such as arcuate or terminating in a sharp angle, but preferably are formed by bending rail 82 at 86, ahead of walls 34 and 36, outwardly at an angle substantially 45°, traversing the line of travel of chains 78, and at 87, parallel with the original line to a point beyond walls 34 and 36, and at 88, inwardly to 89 where it resumes the original line. The distance between 86 and 87 may be varied, according to the height at which it is desired to raise the object suspended from the conveyor. It is to be noted that between the bowed portions 83, the chains are permitted a full drop and the fowl lowered within tank 27.

In operation, a supply of defeathering compound is placed in tank 1. Chamber 16 is filled with water from line 17 and steam circulated therethrough from line 20, to heat tank 1 and liquefy the compound therein. In the meantime, chamber 38 is filled with water from line 45 and steam passed through line 50 to heat tank 27, preparatory to circulating the compound through the same. After heating the compound in tank 1 to a liquid state, the supply of steam flowing through chamber 16 is discontinued for the remainder of the operation by closing valve 23, and pump 66 rotated, by which the compound is continuously drawn from tank 1 and forced into tank 27 through line 70. Tank 27 will fill to a level with the top of the shorter wall 36, and as a fresh supply is continuously forced in, the excess, with the exception of that carried off by the dipped fowl, will flow over wall 36 to fall in the main supply and be recirculated. The temperature in tank 27 is thermostatically controlled by means of heat variations of the compound in contact with bulb 61, which variations are transmitted to thermostat 60, and valve 59 in steam line 50 automatically actuated. It is to be noted that the liquidity of the entire supply of the compound is maintained by its continuous circulation through tank 27, and that only the segregated portion in tank 27 is heated after the apparatus is in operation.

The fowl suspended from conveyor 73 are continuously carried within the path of tank 27, and while so carried, are, by reason of chains 78 striking bowed portions 83, successively raised above walls 34 and 36, and between said bowed portions, lowered within tank 27 to be coated with defeathering compound. As above described, the fowls are determinately suspended, such that the feet and heads of the fowl, upon being lowered within tank 27, will be left free of compound.

The compound dripping from the fowl as they are carried from tank 27, is caught in the main supply and thus recirculated to the dipping tank.

It will be understood that the present invention is not limited to the details of the preferred embodiment which have heretofore been described and that changes in the details may be made without departing from the spirit of this invention as defined in the claims which follow.

The term congealable compound as used in the claims shall be understood to include wax, waxy substances, chill hardening adhesives, and defeathering and depilating compounds, which liquefy with the application of heat and solidify upon chilling.

I claim:

1. A device of the class described, comprising a supply tank, heat exchange means in said tank, a dipping tank cooperatively disposed in fixed relation above said supply tank, means surrounding the walls and bottom of said dipping tank for applying heat thereto, and means for circulating congealable compound between said tanks.

2. A device of the class described, comprising a supply tank, a dipping tank fixedly disposed above said supply tank, means for continuously supplying congealable compound from said supply tank to said dipping tank, and means for applying heat to the segregated portion of said compound contained within said dipping tank.

3. A device of the class described, comprising a supply tank, a dipping tank fixedly disposed above said supply tank, means for continuously circulating congealable compound between said supply tank and said dipping tank, means for applying heat to the compound passing through said dipping tank and means for directing the overflow of compound from said dipping tank to said supply tank.

4. A device of the class described, comprising a dipping tank and a conveyor in fixed relation, shackle chains depending from said conveyor and means including a guide rail provided with bowed portions traversing the path of travel of said chains for lifting objects suspended from said chains over the walls of said dipping tank.

5. A device of the class described, comprising a dipping tank and a conveyor in fixed relation, shackle chains depending from said conveyor and a guide rail disposed beneath the conveyor, said guide rail having bowed portions traversing the line of travel of said chains for guiding fowl suspended from said chains over the walls of said tank.

6. A device of the class described, comprising a dipping tank and a conveyor in fixed relation, shackle chains depending from said conveyor from which fowl are suspended within the path of said tank, and a guide rail disposed beneath said conveyor, said guide rail having bowed portions engageable with said chains to guide the fowl over the walls of said tank.

7. A device of the class described, comprising a dipping tank and a conveyor in fixed relation, means for maintaining congealable compound in said tank at a predetermined level, shackling means depending from said conveyor from which fowl are definitely suspended in a plane beneath the level of said compound, and a guide rail disposed beneath said conveyor, said guide rail having bowed portions traversing the line of travel of said shackling means and engageable with said shackling means for raising and lowering the fowl over the walls of said tank.

8. A device of the class described, comprising a dipping tank in combination with and beneath a conveyor having depending chains, and a guide rail having bowed portions disposed beneath said conveyor, said bowed portions traversing the line of travel of said chains.

9. A device of the class described, comprising a stationary dipping tank in combination with and beneath a conveyor having depending chains, means for automatically shortening the drop of said chains comprising a guide rail disposed between the ends of and at one side of the line of travel of said chains, and bowed portions extending from said rail and traversing the line of travel of said chains.

10. The method of treating fowl, consisting of suspending the fowl with the feet and heads above the body portions thereof, successively advancing the fowl while so suspended within the path of a tank containing a congealable compound, lifting the fowl over the forward wall of said tank, horizontally conveying the fowl between the limits of said tank and with their body portions below the surface of said congealable compound, and lifting the fowl over the rearward wall of said tank, each step being accomplished without interruption to their continuous advancement.

11. The method of treating fowl, consisting of suspending the fowl with the feet and heads above the body portions thereof, successively advancing the fowl while so suspended within the path of a tank containing a congealable compound, lifting the fowl over the forward wall of said tank, horizontally conveying the fowl between the limits of said tank and with their body portions below the surface of said congealable compound, lifting the fowl over the rearward wall of said tank, and recovering the excess compound dripping from said fowl, each step being accomplished without interruption to their continuous advancement.

12. A poultry dipping device including a supply tank, a dipping tank mounted in fixed relation above said supply tank and means for circulating a congealable compound between said tanks and for maintaining a constant supply of the compound in the dipping tank, means for applying heat to the compound at the immediate point of dipping comprising a heating chamber surrounding the walls and bottom of said dipping tank, and means for supplying heat to said chamber.

13. A poultry dipping device including a supply tank, a dipping tank mounted in fixed relation above said supply tank and means for circulating a congealable compound between said tanks and for maintaining a constant supply of the compound in the dipping tank, means for applying heat to the compound at the immediate point of dipping comprising a heating chamber surrounding the walls and bottom of said dipping tank, and means for supplying heat to said chamber comprising a water line emptying into said chamber and a steam line passing through said chamber.

14. A poultry dipping device including a supply tank, a dipping tank mounted in fixed relation above said supply tank and means for circulating a congealable compound between said tanks and for maintaining a constant supply of the compound in the dipping tank, means for applying heat to the compound at the immediate point of dipping comprising a heating chamber surrounding the walls and bottom of said dipping tank, means for supplying heat to said chamber, and means for thermostatically controlling the heat within said chamber, said thermostatic means being actuated by the temperature variations of the compound contained within said dipping tank.

15. A poultry dipping device including a supply tank, a dipping tank mounted in fixed relation above said supply tank and means for circulating a congealable compound between said tanks and for maintaining a constant supply of the compound in the dipping tank, means for applying heat to the compound at the immediate point of dipping comprising a heating chamber surrounding the walls and bottom of said dipping tank, means for supplying heat to said chamber comprising a water line emptying into said chamber, a steam line passing through said chamber, a valve in said steam line, and means for thermostatically controlling said valve, said thermostatic means being actuated by the heat variations of the compound contained within said dipping tank.

ANSON W. DE VOUT.